(12) United States Patent
Nakamuta

(10) Patent No.: US 10,949,877 B2
(45) Date of Patent: Mar. 16, 2021

(54) PROBLEM GENERATION DEVICE, PROBLEM GENERATION METHOD, AND PRIZE MANAGEMENT SYSTEM

(71) Applicant: Akihiro Nakamuta, Tokyo (JP)

(72) Inventor: Akihiro Nakamuta, Tokyo (JP)

( * ) Notice: Subject to any disclaimer, the term of this patent is extended or adjusted under 35 U.S.C. 154(b) by 993 days.

(21) Appl. No.: 15/581,240

(22) Filed: Apr. 28, 2017

(65) Prior Publication Data

US 2017/0228772 A1    Aug. 10, 2017

Related U.S. Application Data

(63) Continuation-in-part of application No. PCT/JP2014/079034, filed on Oct. 31, 2014, and a continuation-in-part of application No. PCT/JP2014/079035, filed on Oct. 31, 2014.

(51) Int. Cl.
   *G06Q 30/00* (2012.01)
   *G06Q 30/02* (2012.01)

(52) U.S. Cl.
   CPC ..... *G06Q 30/0251* (2013.01); *G06Q 30/0273* (2013.01)

(58) Field of Classification Search
   CPC .................. G06Q 30/0251; G06Q 30/0273
   USPC .............................. 705/14.49, 14.69
   See application file for complete search history.

(56) References Cited

U.S. PATENT DOCUMENTS

| | | | |
|---|---|---|---|
| 6,416,413 B1* | 7/2002 | Yoo | G06Q 20/02 463/42 |
| 2001/0027417 A1* | 10/2001 | Sato | G06Q 30/0218 705/14.64 |
| 2002/0029167 A1* | 3/2002 | Muller | G06Q 30/02 705/14.19 |
| 2002/0120509 A1* | 8/2002 | Okano | G06Q 30/02 705/14.14 |
| 2010/0222121 A1* | 9/2010 | Holmes | A63F 3/00643 463/9 |
| 2013/0054353 A1* | 2/2013 | Tabor | G06Q 30/0207 705/14.49 |

(Continued)

FOREIGN PATENT DOCUMENTS

| | | |
|---|---|---|
| JP | 2001-344520 A | 12/2001 |
| JP | 2002-342649 A | 11/2002 |

(Continued)

OTHER PUBLICATIONS

Written Opinion in International Patent Application No. PCT/JP2014/079034, dated Feb. 3, 2015.
Written Opinion in International Patent Application No. PCT/JP2014/079035, dated Feb. 3, 2015.
International Search Report in International Patent Application No. PCT/JP2014/079034, dated Feb. 3, 2015.

(Continued)

*Primary Examiner* — Luis A Brown
(74) *Attorney, Agent, or Firm* — Hauptman Ham, LLP

(57) ABSTRACT

A prize management device is a problem generation device for generating a prize problem, the prize management device includes a first storage part that stores a special problem for a company providing a prize, a second storage part that stores a problem different from a special problem, and a processor that extracts one or more special problems stored in the first storage part, extracts one or more problems, that are different from the special problem, stored in the second storage part, and generates a prize problem including the extracted one or more special problems and the extracted one or more problems different from the special problem.

19 Claims, 12 Drawing Sheets

(56) References Cited

U.S. PATENT DOCUMENTS

| | | | |
|---|---|---|---|
| 2013/0091452 A1* | 4/2013 | Sorden | G01C 21/32 715/771 |
| 2013/0324219 A1* | 12/2013 | Vann | G07F 17/3218 463/25 |
| 2014/0201126 A1* | 7/2014 | Zadeh | A61B 5/165 706/52 |
| 2014/0274383 A1* | 9/2014 | Kwok | A63F 13/87 463/31 |
| 2014/0279178 A1* | 9/2014 | Harman | G06Q 30/0611 705/26.4 |
| 2014/0279259 A1* | 9/2014 | Harman | G06Q 30/0209 705/26.62 |
| 2015/0058119 A1* | 2/2015 | Atli | G06O 30/0276 705/14.49 |
| 2015/0261856 A1* | 9/2015 | Pappula | H04L 12/1813 707/738 |
| 2017/0228772 A1* | 8/2017 | Nakamuta | G06Q 30/0251 |

FOREIGN PATENT DOCUMENTS

| | | |
|---|---|---|
| JP | 2005-189990 A | 7/2005 |
| JP | 2006-195524 A | 7/2006 |
| JP | 2008-102174 A | 5/2008 |

OTHER PUBLICATIONS

International Search Report in International Patent Application No. PCT/JP2014/079035, dated Feb. 3, 2015.

"Obo no Tatsujin" de Kigyomei Betsu Kensaku shimasu, [online], 2013, [retrieval date Jan. 22, 2015 (Jan. 22, 2015)], Internet <URL:https://web.archive.org/web/20130212125410/http://oubo.koukan.org/lib/companylist.html>.

Katsuhito Kiida, "Ataru! Net Kensho no Hosoku", 1st edition, Ohmsha, Ltd., Mar. 23, 2000, pp. 115 and 122, Japan.

* cited by examiner

Company information storage part

| Company ID | Company name | Company introduction information | Area | Category | ... |
|---|---|---|---|---|---|
| C0001 | A Foods | Our company is focusing on quality ... | X city | food | ... |
| C0002 | B Furniture | Our corporate philosophy is... | Y town | furniture | ... |
| ... | ... | ... | ... | ... | ... |

FIG.3

Prize information storage part

| Prize ID | Company ID | Closing date | Number of winners | Award |
|---|---|---|---|---|
| P0001 | C0001 | 2014/10/31 | 5 | 300 points |
| P0002 | C0001 | 2014/10/20 | 2 | Product A |
| ... | ... | ... | ... | ... |

FIG.4

Special problem storage part

| Problem ID | Company ID | Category | Special problem | Correct answer |
|---|---|---|---|---|
| A00001 | C0001 | food | Company A is focusing on ___. | QUALITY |
| A00002 | C0001 | food | A wheat flour-growing district of company A. | HOKKAIDO |
| ... | ... | ... | ... | ... |

FIG.5

Common problem storage part

| Problem ID | Category | Common problem | Correct answer |
|---|---|---|---|
| B00001 | food | From which language does the word "okra" originate? | ENGLISH |
| B00002 | food | A food that is frequently eaten in Kagawa prefecture. | UDON |
| B00003 | health | A muscle that moves arms and legs. | STRIATED MUSCLE |
| ... | ... | ... | ... |

FIG.6

Prize problem storage part

| Prize ID | Company ID | Category | Problem number | Problem ID | Input position | Number of characters | Correct answer |
|---|---|---|---|---|---|---|---|
| P0001 | C0001 | food | 1 Down | A00002 | (0,0) | 6 | HOKKAIDO |
| | | | 1 Across | A00001 | (0,0) | 4 | QUALITY |
| | | | 3 Across | B00002 | (0,5) | 3 | UDON |
| ... | ... | ... | ... | ... | ... | ... | ... |

FIG.8

Answer information storage part

| Prize ID | User ID | Problem number | Answer |
|---|---|---|---|
| P0001 | U0001 | 1 Down | HOKKAIDO |
| | | 1 Across | QUALITY |
| | | ... | ... |
| | ... | ... | ... |
| ... | ... | ... | ... |

FIG.10

User information storage part

| User ID | User name | Home address | Contact address | Number of points | |
|---|---|---|---|---|---|
| | | | | C0001 | C0002 |
| U0001 | ABC | ...., Tokyo | aaa@mail.... | 900 | 500 |
| U0002 | DEF | ...., Tokyo | bb@mail.... | 600 | 0 |
| ... | ... | ... | ... | ... | ... |

FIG.11

Prize problem storage part

| Prize ID | User ID | Problem number | Problem ID | Input position | Number of characters | Correct answer |
|---|---|---|---|---|---|---|
| P0001 | U0001 | 1 Down | A00002 | (0,0) | 6 | HOKKAIDO |
| | | 1 Across | A00001 | (0,0) | 4 | QUALITY |
| | | 3 Across | B00002 | (0,5) | 3 | UDON |
| | | ... | ... | ... | ... | ... |
| | U0002 | 1 Down | A00002 | (0,0) | 6 | HOKKAIDO |
| | | 1 Down | A00003 | (4,0) | 4 | ONION |
| | | 3 Across | B00003 | (0,6) | 3 | APPLE |
| | | ... | ... | ... | ... | ... |
| ... | | | | | | |

FIG.13

PROBLEM GENERATION DEVICE, PROBLEM GENERATION METHOD, AND PRIZE MANAGEMENT SYSTEM

CROSS-REFERENCE TO RELATED APPLICATIONS

The present application is a continuation-in-part application of International Application numbers PCT/JP2014/079034 and PCT/JP2014/079035, filed on Oct. 31, 2014. The contents of those applications are incorporated herein by reference in their entirety.

BACKGROUND OF THE INVENTION

Conventionally, advertisements via paper media, such as a newspaper, an insert flyer, a magazine, and a direct mail, and advertisements via electronic media, such as a web site and an e-mail, are provided. These advertisements have a problem that they cost a great deal of money and a problem that the effect of advertisement is small because there are only a few people who are interested in the advertisement among those who receive the advertisement medium.

For these problems, for example, Japanese Unexamined Patent Application Publication No. 2008-102174 discloses a technique that, when a user searches for a keyword by inputting the keyword on a search site or the like, provides a search advertisement that displays an advertisement corresponding to the keyword with the search result.

However, when an advertisement is provided for a popular keyword, the search advertisement has a problem that a lot of expenses are incurred to display the advertisement corresponding to the top search result. For example, in order to display an advertisement together with a high-ranking search result, it is necessary to set the fee for the advertisement higher than other advertisers when the advertisement is provided for the popular keyword.

As another advertisement technique, there is a method of displaying a web page, which carries a content desired to be advertised, in an upper level of search results on a search site or the like. However, there is a problem that, in many cases, Search Engine Optimization (SEO) must be performed in order to display the web page in the upper level of the search results, which takes time and labor.

In addition, as another advertising technique, there is a method in which an advertiser provides a product of their own as a prize. By providing a prize, the advertiser can acquire information of a prospective customer and can transmit a direct mail, a mail magazine, and the like to the prospective customer. However, there is a problem that the prospective customer throws away the direct mail and the mail magazine without reading them, and a problem that the prospective customer does not read a part that the advertiser wishes them to read although the customer looks at them.

When an advertiser sells a product or service, there is a case where the advertiser wants to introduce a corporate philosophy and a commitment to the product they sell to a customer. For example, because the customer may decide to purchase a product depending on the commitment to the product or the corporate philosophy even when the product is expensive, the advertiser makes an effort to convey the commitment and the corporate philosophy to the customer.

However, since a customer often places importance on the design and the price of products and services or the location and the business hours of a company, there is a problem that a message is not conveyed to the customer because the customer does not read the message even when an advertiser submits the message such as the corporate philosophy or the commitment as advertisement content, posts the message on a web page to which SEO countermeasures have been applied, and transmits a direct mail and the like including the message to a prospective customer acquired by producing a prize.

BRIEF SUMMARY OF THE INVENTION

A problem generation device according to the first aspect of the present invention is a problem generation device for generating a prize problem, the device comprises a first storage part that stores a special problem for a company that provides a prize, a second storage part that stores a problem different from the special problem, and a processor that extracts one or more of the special problems stored in the first storage part, extracts one or more of the problems stored in the second storage part that are different from the special problem, and generates a prize problem including the extracted one or more special problems and the extracted one or more problems that are different from the special problem.

A problem generation method according to the second aspect of the present invention is a problem generation method in which a processor generates a prize problem, the method comprising the steps of extracting one or more special problems stored in a first storage part that stores a special problem for a company that provides a prize, extracting one or more problems, which are different from the one or more special problems, stored in a second storage part that stores a problem different from the special problem, and generating a prize problem including the extracted special problem and the extracted problem different from the special problem.

A prize management system according to the third aspect of the present invention is a prize management system including a problem generation device for generating a prize problem and a terminal, wherein the problem generation device includes a first storage part that stores a special problem for a company that provides a prize, a second storage part that stores a problem different from the special problem, and a processor that extracts one or more special problems stored in the first storage part, extracts one or more problems stored in the second storage part that are different from the special problem, generates a prize problem including the extracted one or more special problems and the extracted one or more problems that are different from the special problem, and transmits the prize problem corresponding to the company to the terminal when receiving a selection of a company from the terminal, and the terminal includes a display, and a processor that performs the selection of the company, receives the prize problem from the problem generation device, and displays the received prize problem on the display.

BRIEF DESCRIPTION OF THE DRAWINGS

FIG. 3 shows an example of information stored in a company information storage part according to the first exemplary embodiment.

FIG. 4 shows an example of information stored in a prize information storage part according to the first exemplary embodiment.

FIG. 5 shows an example of information stored in a special problem storage part according to the first exemplary embodiment.

FIG. 6 shows an example of information stored in a common problem storage part according to the first exemplary embodiment.

FIG. 8 shows an example of information stored in a prize problem storage part according to the first exemplary embodiment.

FIG. 10 shows an example of information stored in an answer information storage part according to the first exemplary embodiment.

FIG. 11 shows an example of information stored in a user information storage part according to the first exemplary embodiment.

FIG. 13 shows an example of information stored in the prize problem storage part according to the second exemplary embodiment.

DETAILED DESCRIPTION OF THE INVENTION

The First Exemplary Embodiment

[Outline of a Prize Management System S]

Figure 1:
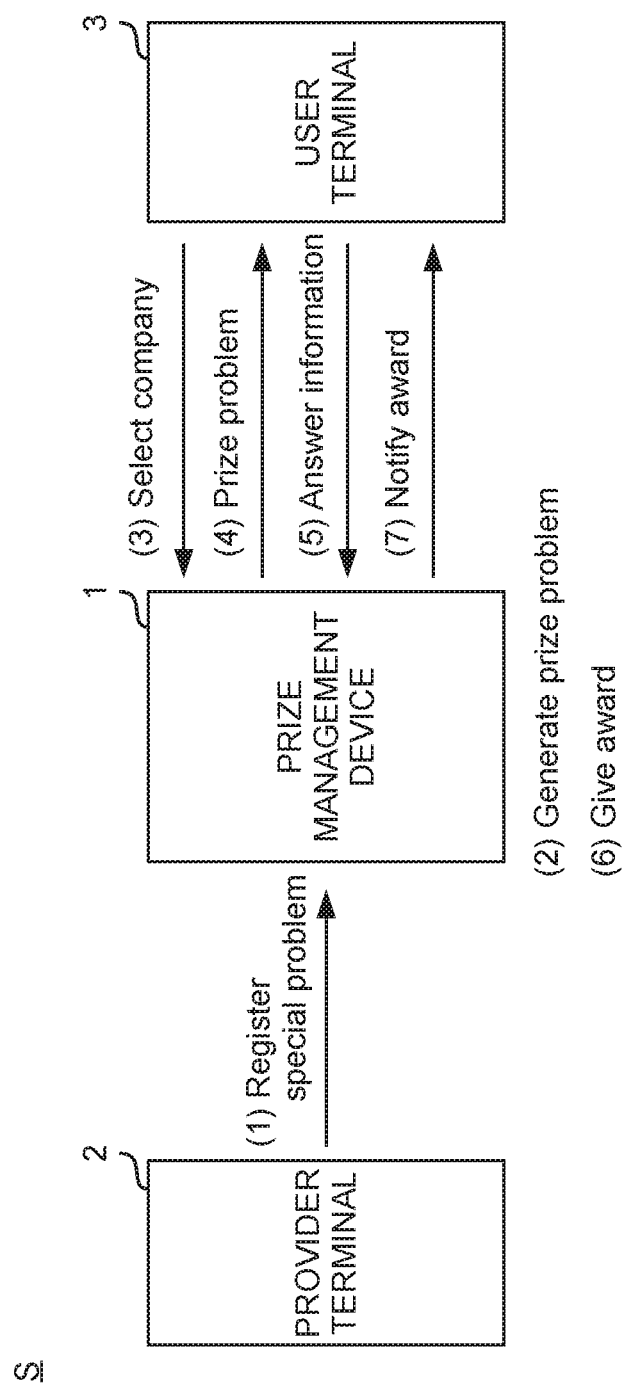
FIG. 1 shows an outline of a prize management system according to the first exemplary embodiment.

FIG. 1 shows an outline of a prize management system S according to the first exemplary embodiment. The prize management system S includes a prize management device 1, a provider terminal 2, and a user terminal 3. The prize management device 1 is a computer that generates a prize problem corresponding to a prize provided by a company and that provides the prize problem to a user who uses a prize service.

The prize management device 1 is connected, in a manner enabling communication, to a provider terminal 2, which is a terminal of a company providing a prize, and a user terminal 3, which is a terminal of a user who uses the prize service, through a communication network (not shown in figures) such as the Internet. The user terminal 3 is, for example, a mobile terminal such as a smartphone, but it is not so limited. The user terminal 3 may be a laptop computer or a desktop personal computer.

The prize management device 1 functions as a problem generation device and receives registration of a special problem for a company from the provider terminal 2. Here, the special problem is a company-specific message, in which the company wishes to convey to people a corporate philosophy, a name of goods sold by the company, a catch phrase, and the like. Therefore, the special problem is generally different for each of a plurality of companies, but there is a case where some special problems are the same. The prize management device 1 stores the received special problem ((1) in FIG. 1). In addition to the special problem, the prize management device 1 stores a common problem that is commonly used by a plurality of companies, and generates a prize problem including one or more of the special problems and one or more of the common problems ((2) in FIG. 1).

The prize management device 1 receives, from the user terminal 3, a selection of one company from among a plurality of companies providing a prize ((3) in FIG. 1). In response to receiving the selection of a company, the prize management device 1 transmits a prize problem corresponding to the company to the user terminal 3 ((4) in FIG. 1). The user terminal 3, which receives the prize problem, receives an answer to the prize problem from the user and transmits answer information indicating the answer to the prize management device 1 ((5) in FIG. 1). Here, by setting the content of the special problem as a message that the company wishes to convey to the user, the user can comprehend the message when solving the special problem included in the prize problem. As a result, the prize management device 1 can efficiently convey to the user the message that the company wishes to convey.

The prize management device 1 selects a prize winner by a lottery or the like from among the users who transmitted the answer information, and the prize management device 1 gives an award corresponding to the prize to the winner ((6) in FIG. 1). The prize management device 1 notifies at least the users who transmitted the answer information that the award has been given ((7) in FIG. 1).

[Configuration Example of the Prize Management Device 1]

Figure 2:
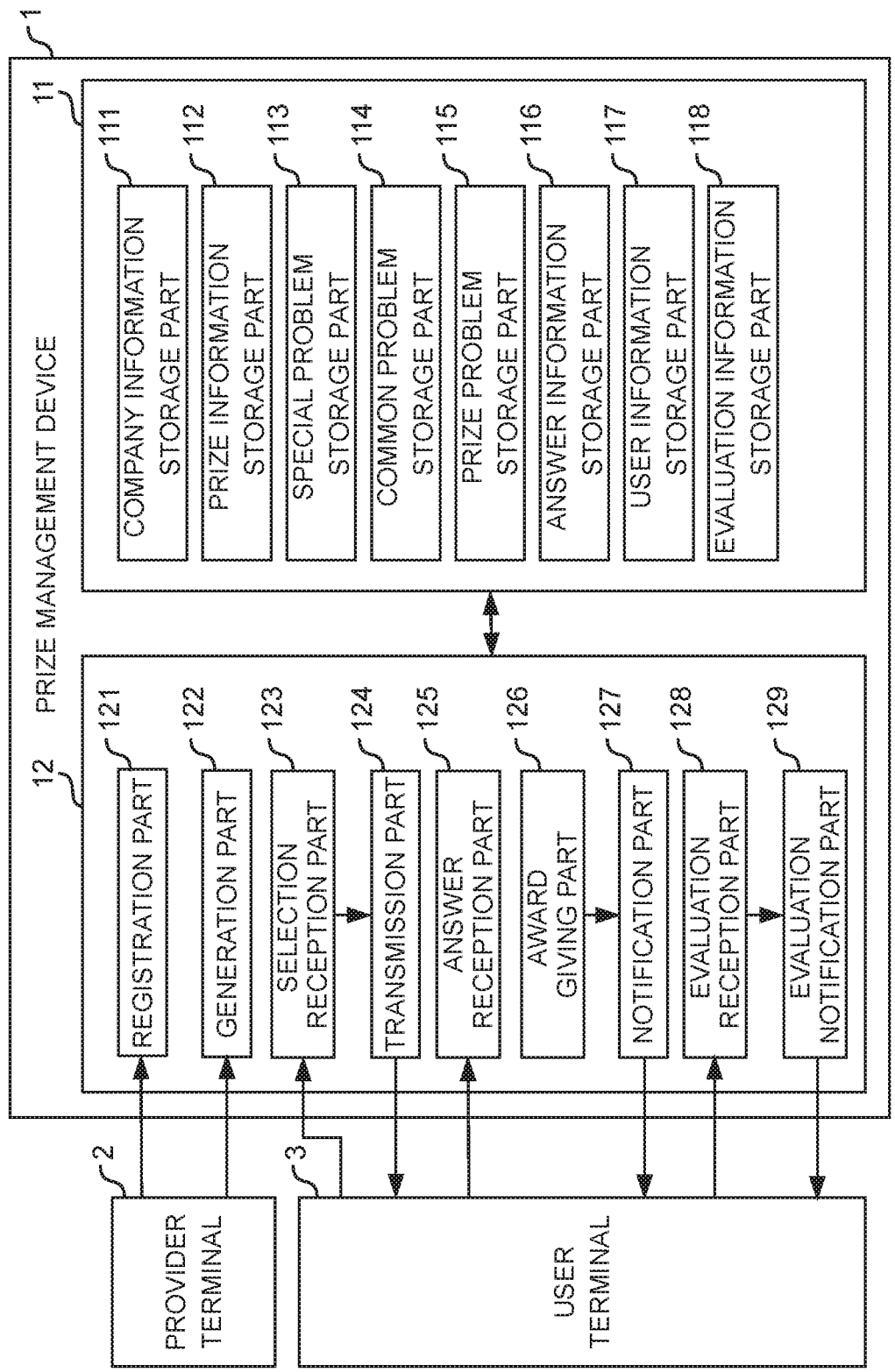
FIG. 2 shows a configuration of a prize management device according to the first exemplary embodiment.

Next, a function configuration of the prize management device 1 is described. FIG. 2 shows a configuration of the prize management device 1 according to the first exemplary embodiment. The prize management device 1 includes a storage part 11 and a control part 12.

The storage part 11 includes, for example, a Read Only Memory (ROM), a Random Access Memory (RAM), and the like. The storage part 11 stores various programs for making the prize management device 1 function. For example, the storage part 11 stores a prize management program that causes the control part 12 of the prize management device 1 to function as a registration part 121, a generation part 122, a selection reception part 123, a transmission part 124, an answer reception part 125, an award giving part 126, a notification part 127, an evaluation reception part 128, and an evaluation notification part 129, which will be described later. The storage part 11 may read and store a program stored in a storage medium such as an external memory or may store a program downloaded from an external device via a network such as the Internet.

Further, the storage part 11 includes a company information storage part 111, a prize information storage part 112, a special problem storage part (a first storage part) 113, a common problem storage part (a second storage part) 114, a prize problem storage part 115, an answer information storage part 116, a user information storage part 117, and an evaluation information storage part 118. Details of these will be described later.

The control part 12 is, for example, a Central Processing Unit (CPU). The control part 12 controls functions of the prize management device 1 by executing the various programs stored in the storage part 11. The control part 12 includes the registration part 121, the generation part 122, the selection reception part 123, the transmission part 124, the answer reception part 125, the award giving part 126, the notification part 127, the evaluation reception part 128, and the evaluation notification part 129.

The registration part 121 receives information about a company from the provider terminal 2 and stores the information in the company information storage part 111. Specifically, the registration part 121 receives, as the information about a company, a company name, company introduction information introducing the company, a category that is information indicating a business category to which the company belongs, and an area where the company is located. Here, in order to receive the company introduction information, the registration part 121 causes the provider terminal 2 to display a model for inputting information and receives a sentence, a photograph, and the like via the model.

When the registration part 121 receives the information about a company, the registration part 121 generates a company ID for identifying the company. This company ID is used as identification information for identifying a company providing a prize. The registration part 121 stores the generated company ID and the received information about the company in association with each other in the company information storage part 111. FIG. 3 shows an example of information stored in the company information storage part 111. The company information storage part 111 stores the company ID, the company name, the company introduction information, the area information indicating the area, and the category in association with each other.

Further, the registration part 121 receives information about a prize from the provider terminal 2, and stores the information in the prize information storage part 112. Specifically, the registration part 121 receives, as the information about a prize, a company ID for identifying a company providing a prize, a closing date for showing the deadline of application for the prize, a number of winners, and information indicating an award corresponding to the prize. When the registration part 121 receives the information on a prize, the registration part 121 generates a prize ID for identifying the prize, and stores the prize ID and the information on a prize in association with each other in the prize information storage part 112. FIG. 4 shows an example of information stored in the prize information storage part 112. The prize information storage part 112 stores the prize ID, the company ID, the closing date, the number of winners, and the information indicating an award in association with each other. Here, an award may be anything such as a point or a product of a company that provides a prize. It should be noted that the prize information storage part 112 stores the number of winners, but it is not so limited. The prize information storage part 112 may store a winning condition such as "an award is given to all prize applicants."

Furthermore, the registration part 121 receives, from the provider terminal 2, a special problem for a company providing a prize and a correct answer to the problem, and registers the received special problem and the received correct answer in the special problem storage part 113. Specifically, the registration part 121 causes the provider terminal 2 to display a special problem registration screen (form screen) for receiving the company ID, the category, the special problem, and the correct answer to the special problem, and the registration part 121 receives the company ID, the category, the special problem, and the correct answer to the special problem through the registration screen.

Here, the category is not limited to information indicating the business type of a company. The category may be information indicating the genre of a prize provided by a company. In addition, the category may include a plurality of pieces of information for classifying companies or prizes provided by the companies. In this manner, the user can narrow down the prizes by narrowing down the categories.

When the registration part 121 receives these pieces of information, the registration part 121 generates a problem ID which is identification information uniquely identifying the special problem, and the registration part 121 registers the problem ID and these pieces of information in association with each other in the special problem storage part 113. FIG. 5 shows an example of information stored in the special problem storage part 113. As shown in FIG. 5, the special problem storage part 113 stores the problem ID, the company ID, the category, the special problem, and the correct answer in association with each other.

It should be noted that the registration part 121 receives the category via the special problem registration screen, but it is not so limited and the registration part 121 may specify the category on the basis of the special problem or the correct answer inputted via the special problem registration screen. For example, category-specifying information, which associates the category with a keyword, may be stored in the storage part 11, and the registration part 121 may refer to the category-specifying information and may specify the category that is associated with the received special problem or the keyword included in the correct answer.

Further, the registration part 121 may function as a first generation part and may receive, from a provider, an address of a page including company information as information that the company wants to present, such as a company philosophy and the like. The registration part 121 may access the page on the basis of the received address and may generate a special problem on the basis of the company information included in the page. The registration part 121 may register the generated special problem in the special problem storage part 113.

Specifically, the registration part 121 receives, from the provider terminal 2, a generation instruction for generating a special problem together with the address of the page including the company information, the company ID, and the category. In response to receiving the generation instruction, the registration part 121 accesses the page. Here, the page is a web page including, for example, an html tag. Subsequently, on the basis of the html tag included in the page, the registration part 121 analyzes the page and extracts a sentence, which has a high possibility of corresponding to company-specific information, such as a "corporate philosophy" and a "company outline." The registration part 121 generates a special problem and an answer on the basis of the extracted sentence.

For example, the registration part 121 analyzes the accessed page and specifies i) a start tag immediately before a keyword such as a "corporate philosophy" and a "company outline" and ii) an end tag corresponding to the start tag so that the registration part 121 specifies a sentence corresponding to the keyword. Here, the registration part 121 regards the keyword surrounded by a specific tag (for example, a character emphasis tag (a strong tag, a b tag, a tag to which style information indicating character emphasis is applied, or the like)) or a symbol (for example, various parentheses) as a correct answer to a problem, and generates a problem of filling in the keyword in a sentence including the keyword as a special problem.

Here, the registration part 121 may temporarily store the generated special problem and the like in the storage part 11, and may store the special problem and the like in the special problem storage part 113 when a prize service administrator, provider, and the like check or correct the problem. In this manner, a prize service administrator, provider, and the like can store the special problem and the like in the special problem storage part 113 after evaluating whether or not the content of the special problem and the like automatically generated by the registration part 121 is appropriate.

Next, the registration part 121 generates a problem ID and stores the problem ID, the received company ID, the received category, the generated special problem, and the generated correct answer in association with each other in the special problem storage part 113. By automatically generating the special problem in this manner, the provider can omit the work of generating the special problem. It should be noted that the registration part 121 may receive a correction of an automatically generated special problem from the provider terminal 2.

Further, the special problem may include only a problem registered manually via the form screen, or only a problem automatically registered by the registration part 121. Furthermore, the special problem may include the problem registered manually via the form screen and the problem automatically registered by the registration part 121 in a mixed manner. Moreover, the registration part 121 does not have to store the special problem only by using the above-described method for storing the special problem, and may store the special problem in the special problem storage part 113 by using other methods.

It should be noted that a company information storage part may be provided in the storage part 11 to store the company ID, the company name, and the company information in association with each other. The registration part 121 may previously store the company information, which is acquired by accessing a website or the like of each company via a communication network such as the Internet, in association with the company ID and the company name in the company information storage part. The registration part 121 may function as a generation part and may receive the company ID or the company name as company identification information from the provider. The registration part 121 may refer to the company information storage part 111 and may generate a special problem on the basis of the company information associated with the received company identification information. The registration part 121 may register the generated special problem in the special problem storage part 113. By automatically generating the special problem in this way, the provider can generate a special problem without specifying the page.

When the generation part 122 receives a generation instruction for generating a prize problem from the provider terminal 2, the generation part 122 functions as a first extraction part and extracts one or more special problems stored in the special problem storage part 113. Further, when the generation part 122 receives the generation instruction for generating the prize problem from the provider terminal 2, the generation part 122 functions as a second extraction part, and extracts one or more common problems (information different from the special problem) stored in the common problem storage part 114. Then, the generation part 122 generates a prize problem including the extracted one or more special problems and the extracted one or more common problems (a problem different from the special problem).

Here, the information stored in the common problem storage part 114 is described. FIG. 6 shows an example of information stored in the common problem storage part 114. The common problem storage part 114 stores a common problem commonly used by a plurality of companies. Specifically, as shown in FIG. 6, the common problem storage part 114 stores a problem ID that is identification information uniquely identifying a common problem, a category to which a common problem belongs, a common problem, and a correct answer corresponding to the common problem in association with each other. These pieces of information are preliminarily registered by, for example, the prize service administrator. It should be noted that the common problem, the correct answer to the common problem, and the category corresponding to the common problem are registered in advance in the common problem storage part 114, but it is not so limited, and they may be registered, for example, after registration of the special problem.

It should be noted that the common problem, the correct answer to the common problem, and the category corresponding to the common problem are registered by the prize service administrator and the like, but it is not so limited. For example, the registration part 121 serving as a generation part may generate a common problem on the basis of information provided by an external device connected via a communication network such as the Internet. Specifically, the registration part 121 may access a web server to which the prize management apparatus 1 can connect via the Internet and may generate a common problem and a correct answer to the common problem on the basis of information included in the web server.

For example, the registration part 121 accesses a news site or the like, and selects a sentence including a keyword surrounded by a specific tag or a symbol from articles provided by the news site. Then, the registration part 121 regards the keyword as a correct answer to the problem, and generates a problem of filling in the keyword in a sentence including the keyword as a common problem. Further, the registration part 121 may refer to the category specifying information, which associates the category with the keyword, and may specify the category related to the keyword as the category corresponding to the common problem.

Here, the registration part 121 may temporarily store the generated common problem and the like in the storage part 11, and may store the common problem and the like in the common problem storage part 114 when a prize service administrator, provider, and the like check or correct the problem. In this manner, a prize service administrator, provider, and the like can store the common problem and the like in the common problem storage part 114 after evaluating whether or not the content of the common problem and the like automatically generated by the registration part 121 is acceptable.

Further, the common problem is a problem commonly used by a plurality of companies, but it is not so limited. For example, the common problem may be a problem different from the special problem, and it does not have to be commonly used by a plurality of companies but may be individually managed by each of a plurality of companies. In this case, the registration part 121 may cause the provider terminal 2 to display a common problem registration screen (form screen) for receiving the company ID, the category, the common problem, and the correct answer to the common problem, and may receive the company ID, the category, the common problem, and the correct answer to the common problem through the common problem registration screen. Then, the registration part 121 may store the company ID, the category, the common problem, and the correct answer to the common problem in the common problem storage part 114. In this manner, it is possible to manage the common problem for each company.

Furthermore, the common problem may include only problems manually registered via the form screen, or only problems automatically registered by the registration part 121. Moreover, the common problem may include a problem manually registered via the form screen and a problem automatically registered by the registration part 121 in a mixed manner. In addition, the registration part 121 does not have to store the common problem only by the above-described common problem storage method, and may store the common problem in the common problem storage part 114 by other methods.

It should be noted that the problem ID corresponding to the common problem and the problem ID corresponding to the special problem are each distinguishably generated. In the present exemplary embodiment, it is assumed that a problem whose problem ID begins with the letter "A" is the special problem and a problem whose problem ID begins with the letter "B" is the common problem.

Here, a specific process of the generation part 122 is described. First, the generation part 122 receives a generation instruction for generating a prize problem from the provider terminal 2. The generation instruction includes the company ID and the prize ID. The generation part 122 refers to the special problem storage part 113 and extracts one or more special problems associated with the company ID included in the generation instruction. Further, the generation part 122 specifies that the category associated with the special problem is the category to which the company belongs by referring to the special problem storage part 113.

Subsequently, the generation part 122 extracts one or more common problems corresponding to the category to which the company belongs stored in the common problem storage part 114. Specifically, the generation part 122 extracts, as an answer, one or more common problems including a character included in the answer of the extracted special problem. Then, the generation part 122 generates a prize problem including the extracted special problem and the extracted common problem. Here, the generation part 122 generates a crossword puzzle as a prize problem including the extracted special problem and common problem. It should be noted that the generation part 122 generates a crossword puzzle, but it is not so limited. The generation part 122 may generate a puzzle or game as a collection of one or more special problems and one or more common problems as a prize problem.

For example, the generation part 122 firstly provides blank answer squares corresponding to the number of characters of a correct answer for one of the extracted special problems. Then, the generation part 122 extracts the common problem including the characters included in the correct answer to be inputted to the blank answer squares. For example, when the correct answer to the special problem is "HOKKAIDO," the generation part 122 selects the common problem corresponding to the correct answer "UDON" including the characters constituting "HOKKAIDO." And then, blank answer squares for the common problem are added so that they connect to the blank answer squares for the correct answer of the special problem. For example, when the blank answer squares corresponding to the special problem are vertically aligned, the blank answer squares corresponding to the common problem are horizontally aligned.

Subsequently, the generation part 122 selects a problem, for which blank answer squares have not been set, from among the extracted special problems or the extracted common problems. Then, the generation part 122 judges whether or not the answer of the problem includes a character that matches the character included in the answer to the problem for which blank answer squares have already been set. In a case where a character which matches the character is included, the generation part 122 provides the blank answer squares for the newly selected problem such that it is connected to an already provided blank answer square. In addition, when there is no character which matches the character, the generation part 122 independently provides the blank answer squares. By repeating this process, the generation part 122 generates a crossword puzzle.

Figure 7:
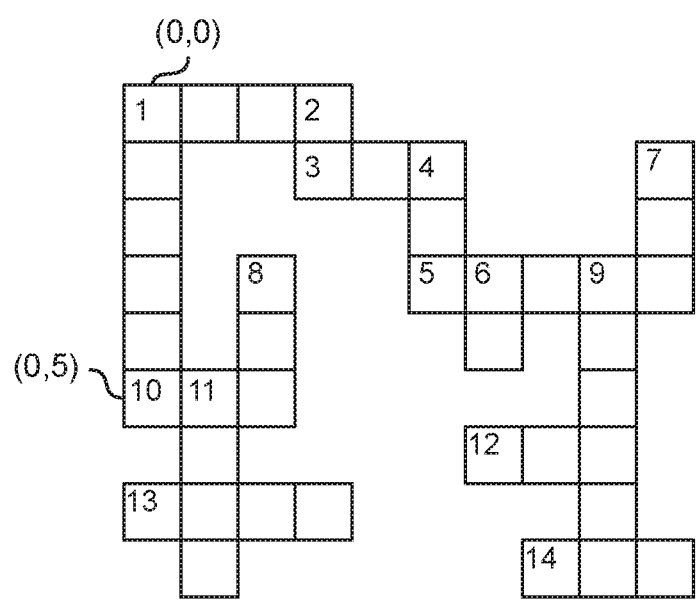
FIG. 7 shows an example of a crossword puzzle generated by a generation part according to the first exemplary embodiment.

The crossword puzzle generated by the generation part 122 is described with reference to an example shown in FIG. 7. First, in the present exemplary embodiment, the coordinates of the upper left blank answer square provided in the crossword puzzle are set to the origin (0, 0). Then, the position in the right direction with respect to the origin is defined as X, the position in the downward direction with respect to the origin is defined as Y, and the coordinates of an arbitrary square are expressed as (X, Y).

A problem number is attached to an input position of an answer to the special problem and the common problem. This problem number is identification information indicating which answering square the special problem and the common problem included in the crossword puzzle correspond to. For example, in the example shown in FIG. 7, the number "1" is attached to the origin (0, 0). This number "1" corresponds to the problem of filling the vertically aligned squares and the problem of filling the horizontally aligned squares. For example, the problem number of a problem for filling the vertically aligned squares corresponding to the number "1" is expressed as "1 down," and the problem number of the problem for filling horizontally aligned squares corresponding to the number "1" is expressed as "1 across."

FIG. 8 shows an example of information stored in the prize problem storage part 115. The prize problem storage part 115 stores a plurality of prize problems. As shown in FIG. 8, the prize problem storage part 115 stores a prize ID, a company ID, a category, a problem number corresponding to a special problem and a common problem included in the crossword puzzle, a problem ID for identifying the special problem and the common problem, an input position which is information indicating coordinates of squares to which an answer is inputted, a number of characters which is information indicating the number of characters of a correct answer, and a correct answer corresponding to the problem in association with each other.

When the generation part 122 generates the crossword puzzle, the generation part 122 stores the prize ID, the company ID, the category, the problem number, the problem ID, the input position, the number of characters of the answer, and the correct answer in association with each other in the prize question storage part 115.

It should be noted that the generation part 122 may receive a difficulty level of the crossword puzzle (a degree of difficulty of the problems constituting the crossword puzzle or a size of the crossword puzzle) at the time of generating the crossword puzzle, and may generate the crossword puzzle on the basis of the difficulty level. On this occasion, the generation instruction may include the difficulty level of the prize problem. Further, the generation part 122 may determine the difficulty level of the crossword puzzle on the basis of a value of a prize provided by a company, and may generate the crossword puzzle on the basis of the difficulty level. In this case, the difficulty level of the crossword puzzle may be stored in association with the prize ID and the company ID in the prize problem storage part 115.

The selection reception part 123 receives a selection of a company from the user terminal 3 used by a user who applies for a prize. Specifically, the selection reception part 123 provides, for example, a page for a prize, and receives a request to apply for a prize from the user terminal 3 via the page. When the selection reception part 123 receives the request to apply for the prize, the selection reception part 123 transmits to the user terminal 3 a selection screen for selecting at least one of categories and areas of companies providing a prize.

When the selection reception part 123 receives the selection of the category from the user terminal 3, the selection reception part 123 specifies companies belonging to the category by referring to the company information storage part 111. Then, the selection reception part 123 transmits information indicating the specified companies to the user terminal 3 and receives a selection of one company from among the companies.

Further, when the selection reception part 123 receives the selection of the area from the user terminal 3, the selection reception part 123 specifies companies belonging to the area by referring to the company information storage part 111. Then, the selection reception part 123 transmits information indicating the specified companies to the user terminal 3, and receives the selection of one company from among the companies. It should be noted that the selection reception part 123 may receive the selection of a station name as the information indicating the area.

Here, for example, the selection reception part 123 transmits, to the user terminal 3, a company selection screen including the company name corresponding to the specified company ID as the information indicating the company specified on the basis of the area or the category. The user terminal 3 functions as a selection part. When the user of the user terminal 3 refers to the company selection screen and selects a company of interest, the user terminal 3 transmits a problem request including the company ID, which requests a prize problem, to the prize management device 1. The selection reception part 123 receives the selection of the company by receiving the problem request. In this manner, the user of the user terminal 3 can select a company corresponding to the category or the area that the user desires. The selection reception part 123 may transmit, to the user terminal 3, the company selection screen including crossword puzzles as prize problems and may receive the selection of a company by selecting a crossword puzzle.

It should be noted that the selection reception part 123 may receive the selection of both of the category and the area, may transmit information indicating companies corresponding to the received category and the received area to the user terminal 3, and may receive the selection of one company from among the companies. For example, the selection reception part 123 may transmit, to the user terminal 3, information indicating a plurality of companies belonging to the category selected by the user terminal 3. Then, the selection reception part 123 may receive a selection of an area in which the user is interested from among areas corresponding to each of the plurality of companies. Further, the selection reception part 123 may transmit, to the user terminal 3, information indicating the plurality of companies belonging to the area selected by the user terminal 3. And then, the selection reception part 123 may receive a selection of a category in which the user is interested from among categories corresponding to each of the plurality of companies.

Furthermore, the selection reception part 123 may transmit, to the user terminal 3, information indicating an award corresponding to each of the plurality of prizes. The selection reception part 123 may receive the selection of a company associated with the award by receiving one award from among the plurality of awards. For example, when the selection reception part 123 receives the selection of a category from the user terminal 3, the selection reception part 123 specifies an award of a prize belonging to the category by referring to the prize information storage part 112 and the prize problem storage part 115. Then, the selection reception part 123 may transmit the information indicating the specified award to the user terminal 3 and may receive the selection of a company associated with the award by receiving the selection of one award from among the awards.

Further, when the selection reception part 123 receives the selection of the difficulty level of the crossword puzzle, the selection reception part 123 may transmit the information indicating the company associated with the difficulty level to the user terminal 3. The selection reception part 123 may receive the selection of one company from among the companies. For example, when the selection reception part 123 receives the selection of the difficulty level of the crossword puzzle, the selection reception part 123 specifies a prize award corresponding to the difficulty level by referring to the prize information storage part 112 and the prize problem storage part 115. Then, the selection reception part 123 may transmit the information indicating the specified award to the user terminal 3 and may receive the selection of a company associated with the award by receiving the selection of one award from among the awards. Furthermore, the selection reception part 123 may transmit, to the user terminal 3, the crossword puzzle corresponding to the award at the time of receiving the selection of an award, and so the user can confirm the crossword puzzle before selecting the award.

Moreover, the selection reception part 123 may receive position information indicating the position of the user terminal 3 from the user terminal 3. The selection reception part 123 may transmit, to the user terminal 3, information indicating the companies located within a predetermined range from a position indicated by the received position information and may receive the selection of one company from among the companies. For example, when the selection reception part 123 receives the position information indicating the position of the user terminal 3, the selection reception part 123 specifies the area indicated by the position information. Then, the selection reception part 123 specifies companies belonging to the area by referring to the company information storage part 111. The selection reception part 123 transmits information indicating the specified companies to the user terminal 3 and receives a selection of one company from among the companies. It should be noted that the selection reception part 123 specifies a company located within the area indicated by the position information as a company located at a position within a predetermined range from the position indicated by the position information, but it is not so limited. For example, a company located within 1 km from the position indicated by the position information may be specified. In this manner, even when the award corresponding to the winning prize is an award provided at the location of the company, the user of the user terminal 3 can reach the location in a short time to receive the award.

Further, the selection reception part 123 may receive a search keyword from the user terminal 3 and may select a company corresponding to the keyword. Specifically, when the selection reception part 123 receives the keyword from the user terminal 3, the selection reception part 123 specifies the company introduction information including the keyword by referring to the company introduction information stored in the company information storage part 111. Then, the selection reception part 123 may transmit, to the user terminal 3, the information indicating companies corresponding to the specified company introduction information and may receive the selection of one company from among the companies. In this manner, the user of the user terminal 3 can select a company corresponding to the keyword desired by the user.

The transmission part 124 refers to the prize problem storage part 115, extracts the prize problem corresponding to the selected company, and transmits it to the user terminal 3. Specifically, the transmission part 124 specifies the prize ID associated with the company ID included in the problem request by referring to the prize problem storage part 115. The transmission part 124 generates an input form for inputting an answer of the crossword puzzle on the basis of the problem number, the input position, and the number of characters associated with the specified prize ID. Further, the transmission part 124 refers to the special problem storage part 113 and the common problem storage part 114, specifies a special problem or a common problem corresponding to the problem ID associated with the problem number, and generates a problem list of the crossword puzzle. The transmission part 124 transmits an answer input screen including the generated input form and the generated problem list to the user terminal 3.

Figure 9:
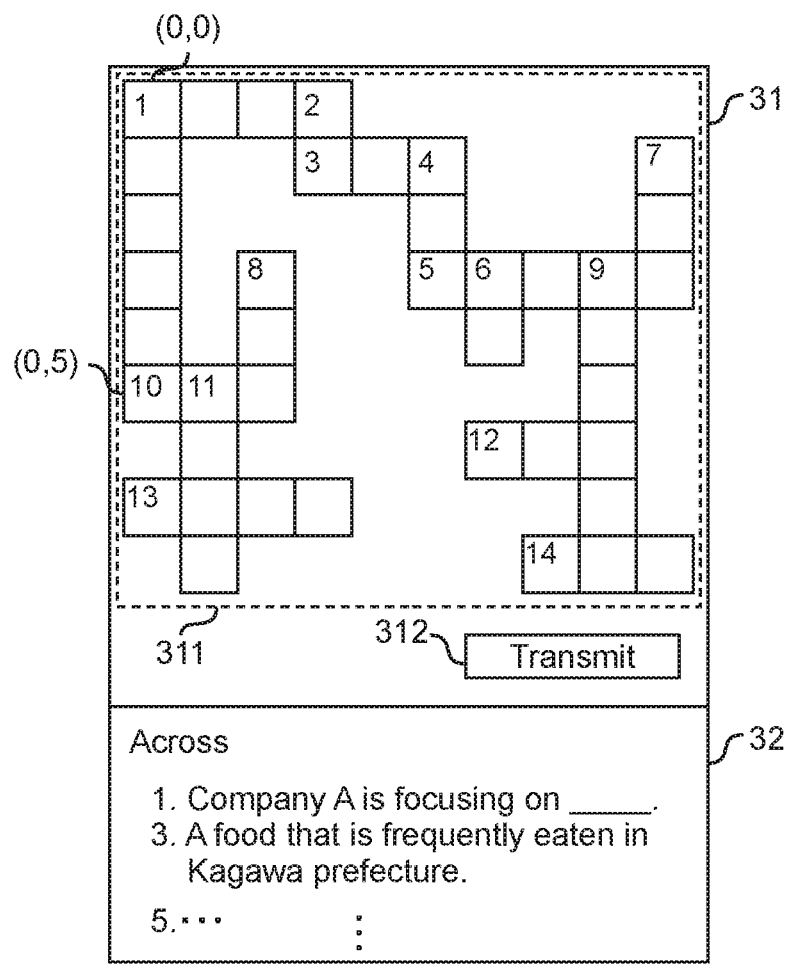
FIG. 9 shows an example of an answer input screen according to the first exemplary embodiment.

FIG. 9 shows an example of an answer input screen. As shown in FIG. 9, the answer input screen includes an input form region 31 and a problem region 32. The input form region 31 includes an input form 311 for receiving an input of an answer from the user of the user terminal 3 and a transmission button 312 for transmitting the inputted answer to the prize management device 1. Here, the transmission button 312 may be controlled so that it can be pressed when all answers are inputted to the input form. The problem list is displayed in the problem region 32 and, for example, the problem list is scrolled through when a swipe operation or a flick operation is performed on this area in the user terminal 3. It should be noted that the content of the prize may be displayed on the answer input screen.

In addition, in order to inform the user as to where an answer is posted, a link to a page where the answer is posted may be inserted on the answer input screen so that the user can confirm the page. For example, the registration part 121 receives, from the provider terminal 2, an address of the page where the answer is posted together with a special problem at the time of generating the special problem, and stores it in the special problem storage part 113. Further, the generation part 122 generates a crossword puzzle in association with the special problem and the address when generating the crossword puzzle. In the problem list included in the answer input screen, the generation part 122 may provide a hint button and may allow a problem to be selected. When the hint button is pressed while the problem is selected, the generation part 122 may display the link to a page where the answer is posted, or may allow the user to directly shift into the page.

The user terminal 3 functions as a reception part and receives an answer input screen of a crossword puzzle as a prize problem. When an answer is inputted to the input form 311 and an operation of pressing the transmission button 312 is performed in the user terminal 3, answer information is transmitted. The answer information includes the prize ID, the user ID of the user of the user terminal 3, the plurality of problem numbers, and the answers corresponding to these problem numbers.

The answer reception part 125 receives the answer information from the user terminal 3. The answer reception part 125 stores the received answer in the answer information storage part 116. FIG. 10 shows an example of information stored in the answer information storage part 116. The answer information storage part 116 stores the answer information of the user corresponding to the crossword puzzle. Specifically, the answer information storage part 116 stores the prize ID, the user ID, the problem number, and the answer in association with each other.

When the application for the prize has ended, the award giving part 126 selects, by a lottery, a user to whom an award corresponding to the prize is given from among the users who applied for the prize, and gives the award to the user who won the prize. Specifically, the award giving part 126 first specifies the user who correctly answered the crossword puzzle by collating the answer of the user stored in the answer information storage part 116 with the correct answer stored in the prize problem storage part 115. Then, the award giving part 126 refers to the prize information storage part 112 and selects a winning user by a lottery from among the users who correctly answered to the crossword puzzle.

In a case where the award to be given to the user is a point, the award giving part 126 refers to the number of points stored in the user information storage part 117 and performs a process of adding points. FIG. 11 shows an example of information stored in the user information storage part 117.

As shown in FIG. 11, the user information storage part 117 stores the user ID, the user name, the home address of the user, the contact address of the user, and the number of points held by the user in association with each other. In the example shown in FIG. 11, the points are managed in association with each of a plurality of companies using the prize service. In FIG. 11, for example, the user ID "U0001" holds 900 points as the points corresponding to the company "C0001."

When the award is a point, the award giving part 126 gives an independent point of each of a plurality of shops to the user who won the prize. By adopting the independent points for a plurality of shops, it is possible to prevent a user who has been given a point from using the point in another shop which results in losing the customer to another shop.

Further, when the award is not a point, the award giving part 126 specifies the user name, the home address, and the contact address of the winning user by referring to the user information storage part 117. The award giving part 126 transmits the specified information as winner information to the provider terminal 2 corresponding to the company that provides the prize. As a result, the person in charge of the company providing the prize can send the prize winning item or the like to the winner on the basis of the winner information.

The notification part 127 provides the user ID of the user who won the prize as notification to at least the users who applied for the prize. For example, the notification part 127 specifies the user ID of the user who answered the crossword puzzle corresponding to the prize to which the lottery was performed by referring to the answer information storage part 116. Then, the notification part 127 specifies the contact address of the user associated with the user ID by referring to the user information storage part 117. The notification part 127 transmits, to the specified contact address, the notification information including the user ID of the user who won the prize.

Further, the notification part 127 may transmit the user ID of the user who won the prize to the provider terminal 2 corresponding to the company that provides the prize, and may post the user information on the web site or the like of the company. In this manner, the prize management device 1 can make it known that the lottery is performed fairly.

The evaluation reception part 128 receives an evaluation of the company from the user. For example, a page including an evaluation reception form for receiving the evaluation of each company is set up in the prize website or the company website. Then, the evaluation reception part 128 receives an evaluation of the company from the user using the prize service via the page. The evaluation reception part 128 receives, in the evaluation reception form, an input of the user ID and the evaluation information indicating the evaluation content. Here, the company ID is associated with the evaluation reception form in advance, and when the evaluation reception part 128 receives the input, the evaluation reception part 128 stores the company ID, the user ID, and the evaluation information in association with each other in the evaluation information storage part 118.

The evaluation notification part 129 provides, to the user terminal 3, notification concerning the evaluation corresponding to each of a plurality of companies. For example, in a prize website, there is provided a link for a page for receiving an inquiry about an evaluation corresponding to each of a plurality of companies in a page for selecting a company providing a prize. The address of the link destination indicates the prize management device 1, and a parameter indicating the company ID is attached thereto. When the prize management device 1 is accessed from the user terminal 3 via the link of an evaluation browsing page, the evaluation notification part 129 extracts the user ID and the evaluation information corresponding to the company ID from the evaluation information storage part 118. Then, the evaluation notification part 129 generates an evaluation page including the extracted user ID and the extracted evaluation information, and transmits the evaluation page to the user terminal 3.

In this manner, the other users who browse the evaluation information can comprehend the evaluation of the company. Further, because the user ID is associated with the evaluation information in the evaluation page, the other users who browse the evaluation information can specify the tendency of the evaluation of the user who made the evaluation, and can judge the reliability of the evaluation by the user.

Figure 12:
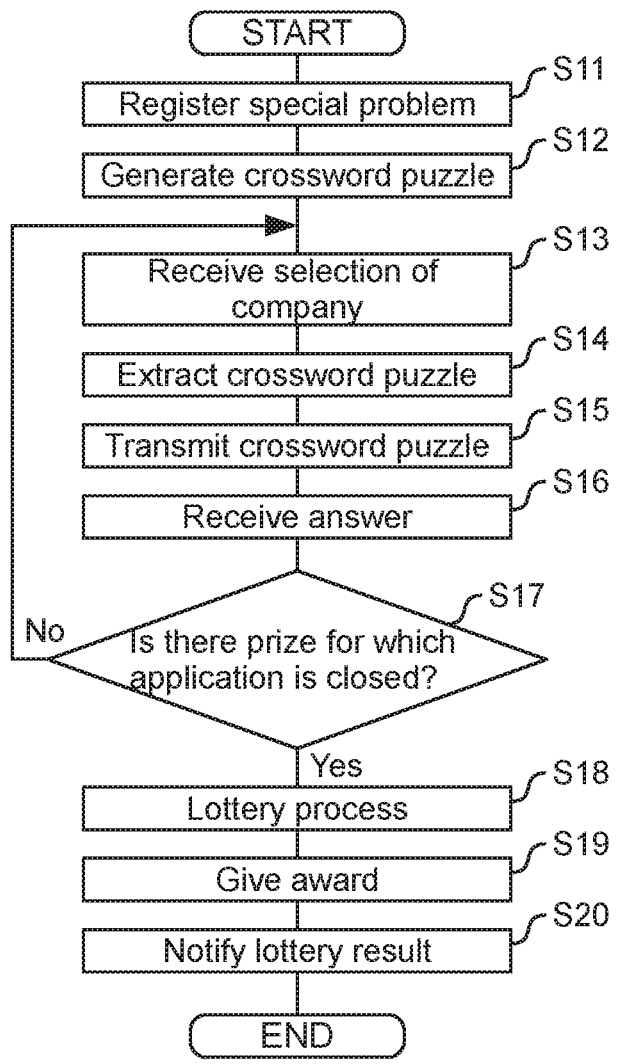
FIG. 12 is a flowchart showing an example of a flow of a process of the prize management device according to the first exemplary embodiment.

Next, a flow of a process of the prize management device 1 is described using a flowchart. FIG. 12 is a flowchart showing an example of a flow of a process of the prize management device 1 according to the first exemplary embodiment. Here, a flow of the process from registration of the special problem to notification of a lottery result of the prize is described.

First, the registration part 121 receives a special problem from the provider terminal 2 and registers the received special problem in the special problem storage part 113 (S11). Subsequently, when the generation part 122 receives a generation instruction for generating a prize problem from the provider terminal 2, the generation part 122 generates a crossword puzzle as a prize problem including one or more special problems stored in the special problem storage part 113 and one or more common problems stored in the common problem storage part 114 (S12). When the generation part 122 generates a crossword puzzle, the generation part 122 stores the information related to the crossword puzzle in the prize problem storage part 115.

Next, the transmission part 124 receives a selection of a company from the user terminal 3 (S13). Then, the transmission part 124 extracts a crossword puzzle corresponding to the company (S14) when the company is selected, and transmits the crossword puzzle to the user terminal 3 (S15). Subsequently, the answer reception part 125 receives answer information from the user terminal 3 (S16). The answer reception part 125 stores the received answer in the answer information storage part 116.

Next, the award giving part 126 judges whether or not there is a prize for which the application has ended (S17). If the award giving part 126 judges that there is a prize for which the application has ended, the award giving part 126 moves the process to S18, and if the award giving part 126 judges that there is no prize for which the application has ended, the award giving part 126 moves the process to S13.

Subsequently, with respect to the prize for which the application has ended, the award giving part 126 selects, by a lottery, a user to whom an award corresponding to the prize is given from among the users who applied for the prize (S18), and gives the award to the user who won the prize (S19). Then, the notification part 127 notifies at least the users who applied for the prize of the user identification information for identifying the user who won the prize (S20).

[Effect of the First Exemplary Embodiment]

As described above, the prize management device 1 according to the first exemplary embodiment generates a crossword puzzle including one or more special problems stored in the special problem storage part 113 and one or more common problems stored in the common problem storage part 114. By setting the contents of the special problem as the message that the company wishes to convey to the user, the user sees the message when solving the special problem included in the crossword puzzle. Further, an award corresponding to this crossword puzzle can be set on the basis of, for example, the budget assigned for the prize by the prize provider. Accordingly, the prize management device 1 can efficiently convey, to the user, the message that the prize provider as the advertiser wishes to convey.

The Second Exemplary Embodiment

[Making the Prize Problems Presented to Each of a Plurality of Users Different]

Next, the second exemplary embodiment is described. In the first exemplary embodiment, the prize management device 1 transmits the same crossword puzzle to each of a plurality of users on the basis of the information stored in the prize problem storage part 115. However, if the same crossword puzzle is transmitted to each of a plurality of users and answers are received from them, there is a possibility that the users cooperate with each other to input the answers. In such a case, there is a possibility that the message, which the prize provider wishes to convey to the user by using the special problem, is not sufficiently conveyed to the user. Therefore, the prize management device 1 according to the second exemplary embodiment makes the prize problems presented to each of a plurality of users different. The details of the prize management device 1 according to the second exemplary embodiment will be described below, but a description of the same configuration as in the first exemplary embodiment will be omitted.

First, information stored in the prize problem storage part 115 of the second exemplary embodiment is different from information stored in the prize problem storage part 115 according to the first exemplary embodiment. FIG. 13 is an example of the information stored in the prize problem storage part 115 according to the second exemplary embodiment. As shown in FIG. 13, the prize problem storage part 115 of the second exemplary embodiment stores the prize ID, the user ID, the problem number, the problem ID, the input position, the number of characters, and the correct answer in association with each other.

When the selection of a company is performed, the generation part 122 randomly selects one or more special problems and one or more common problems to generate a crossword puzzle. Here, the generation part 122 receives the user ID when the company is selected in the user terminal 3. Further, the generation part 122 specifies the prize ID corresponding to the company ID of the selected company by referring to the prize information storage part 112. The generation part 122 stores the prize ID, the user ID, the problem number as the information on the crossword puzzle, the problem ID, the input position, the number of characters, and the correct answer in association with each other in the prize problem storage part 115.

It should be noted that the generation part 122 may generate a crossword puzzle by randomly selecting one or more special problems and one or more common problems when the selection of a company is performed, but it is not so limited. For example, the generation part 122 receives designation of a special problem to be included in the crossword puzzle from the provider terminals 2 of a plurality of companies. Then, the generation part 122 always includes one or more designated special problems for each of the crossword puzzles of the plurality of companies, so that the one or more special problems are made common and only one or more common problems are randomly selected. In this manner, the prize provider can convey the same message to the users who solve the crossword puzzle.

Further, when the same user selects a prize of the same company a plurality of times, the generation part 122 may generate a crossword puzzle including a different special problem in association with the user. For example, the generation part 122 refers to the prize ID in the prize problem storage part 115 and the prize information storage part 112, and judges whether or not the same user has selected the prize of the same company a plurality of times. Then, when the generation part 122 judges that the same user has selected the prize of the same company a plurality of times, the generation part 122 may generate a crossword puzzle including a special problem that is not associated with the user ID of the user in the prize problem storage part 115. In this manner, the prize provider can convey more messages to the user who applied for the prize of the same company a plurality of time than to the user who has not applied a plurality of times.

When the application for the prize has ended, the award giving part 126 selects, by a lottery, a user to whom an award corresponding to the prize is given from among the users who applied for the prize, and gives the award to the user who won the prize. Specifically, the award giving part 126 first specifies the user who correctly answered the crossword puzzle by collating the answer of the user stored in the answer information storage part 116 with the correct answer stored in the prize problem storage part 115. On this occasion, because different crossword puzzles are generated for each of a plurality of users with respect to one prize ID in the second exemplary embodiment, the answer of the user stored in the answer information storage part 116 is collated with the correct answer stored in the prize problem storage part 115 with the prize ID and the user ID as keys. Then, the award giving part 126 refers to the prize information storage part 112 and performs a lottery for extracting a winning user from among the users who correctly answered the crossword puzzle.

[Effect of the Second Exemplary Embodiment]

As described above, when a company is selected, the prize management device 1 according to the second exemplary embodiment randomly selects one or more special problems and one or more common problems to generate a crossword puzzle. In this manner, the prize management device 1 can prevent a plurality of users from inputting an answer by cooperating with each other, and can surely convey, to the user who applies for the prize, the message that the prize provider wishes to convey.

The Third Exemplary Embodiment

[Receiving the Selection of a Company from Among Companies in a User's Bookmarks]

Next, the third exemplary embodiment is described. In the first embodiment, the user terminal 3 selects a category, an area, and the like when applying for a prize, and then selects any of the companies belonging to the category, the area, and the like. On the other hand, the third exemplary embodiment is different from the first embodiment in a point that the user can narrow down companies that provide a prize out of the companies in a user's bookmark, and is the same as the first exemplary embodiment with respect to the other points.

Figure 14:
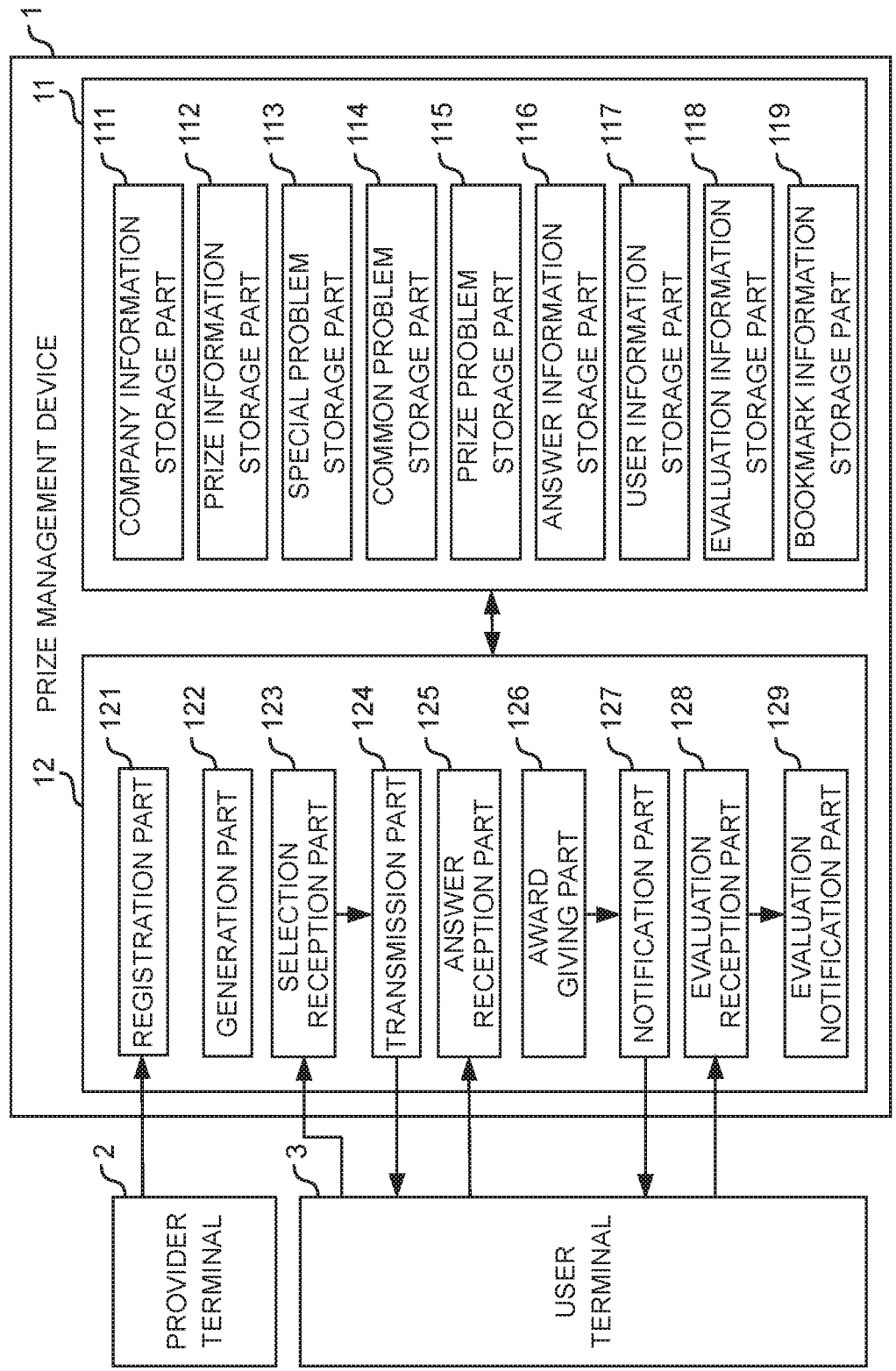
FIG. 14 shows a configuration of the prize management device according to the third exemplary embodiment.

FIG. 14 shows a configuration of the prize management device 1 according to the third exemplary embodiment. As shown in FIG. 14, the prize management device 1 further includes a bookmark information storage part 119. The bookmark information storage part 119 stores the user ID of the user of the user terminal 3 in association with the company ID of a company selected by the user as a bookmarked company. The bookmark information storage part 119 is used to generate a bookmark list for browsing the content of the prizes related to the company bookmarked by the user of the user terminal 3.

The registration part 121 according to the third exemplary embodiment receives, from the user terminal 3, the user ID corresponding to the user of the user terminal 3 and the company ID of the bookmarked company. The registration part 121 stores the received user ID and the company ID in association with each other in the bookmark information storage part 119.

When the registration part 121 receives the user ID from the user terminal 3, the selection reception part 123 specifies information indicating a company corresponding to the company ID associated with the user ID by referring to the bookmark information storage part 119. The selection reception part 123 transmits the information indicating the specified companies to the user terminal 3 and receives the selection of the company from among the companies.

Specifically, the selection reception part 123 receives a request to apply for the prize from the user terminal 3 used by the user applying for the prize. This request includes the user ID. When the selection reception part 123 receives the user ID by receiving the request to apply for the prize from the user terminal 3, the selection reception part 123 specifies the company ID associated with the user ID by referring to the bookmark information storage part 119. Further, the selection reception part 123 specifies the prize award associated with the specified company ID by referring to the prize information storage part 112. The selection reception part 123 generates a bookmark list including the company name corresponding to the company ID and the information indicating the content of the prize award, and transmits the bookmark list to the user terminal 3. As a result, by referring to the bookmark list, the user of the user terminal 3 can select the prize while seeing the content of the prizes corresponding to the company previously selected by the user.

[Effect of the Third Exemplary Embodiment]

As described above, the prize management device 1 according to the third exemplary embodiment refers to the bookmark information storage part 119, transmits information indicating companies corresponding to the company IDs associated with the user ID to the user terminal 3, and receives a selection of a company from among the companies. In this manner, the user of the user terminal 3 can easily select a company to apply for a prize from among the companies in the user's bookmark.

The present invention is explained with the exemplary embodiments of the present invention but the technical scope of the present invention is not limited to the scope described in the above embodiment. It is apparent for those skilled in the art that it is possible to make various changes and modifications to the embodiment. It is apparent from the description of the scope of the claims that the forms added with such changes and modifications are included in the technical scope of the present invention.

In the above-described exemplary embodiments, the special problem storage part 113 for storing the special problem and the common problem storage part 114 for storing the common problem are provided, but it is not so limited, and one storage part may store a special problem, a common problem, and a problem type indicating whether the problem stored in the storage part is a special problem or a common problem in association with each other.

Further, in the above-described exemplary embodiments, the special problem storage part 113 and the common problem storage part 114 are provided in the storage part 11, but it is not so limited. For example, at least any of the special problem storage part 113 and the common problem storage part 114 may be provided in an external device that is connected to the prize management device 1 in a manner enabling communication. In this case, the prize management device 1 may access the external device, and may store at least any of a special problem and a common problem in the external device or extract at least any of a special problem and a common problem from the external device at the time of generating the crossword puzzle.

It should be noted that, in the above-described exemplary embodiments, the prize service administrator provided by the prize management device 1 is different from the prize provider, but it is not so limited. For example, the administrator and the provider of the prize service may be the same and the administrator of the prize service may provide the prize.

What is claimed is:

1. A problem generation device for generating a crossword puzzle, the device includes a processor and a memory, wherein
    (i) one or more special problems corresponding to one or more character strings to be input to blank squares of the crossword puzzle and (ii) a special correct-answer word to the one or more special problems are stored in a first region of the memory, the special problem being for a company that provides a prize to a winner from among persons who answer the crossword puzzle, and
    (i) one or more common problems which corresponds to each of a plurality of character strings to be input to the blank squares of the crossword puzzle and (ii) a common correct-answer word to the one or more common problems are stored in a second region of the memory, the common problem being common to the company and other companies, and
    the processor stores, as a first character string to be input to blank squares in a first direction starting from first coordinates of the crossword puzzle, (i) one special problem in which the length of the special correct-answer word matches the length of the first character string, from among the one or more special problems stored in the first region of the memory and (ii) the special correct answer-word to the special problem in association with coordinates of the first character string, and stores, as a second character string to be input to blank squares in a second direction starting from second coordinates of the crossword puzzle, (i) one common problem including a character common to a word included in the special correct-answer word to the special problem stored in the memory as the first character string, from among the common problems stored in the second region of the memory and (ii) the common correct answer-word to the common problem in association with coordinates of the second character string, and
    wherein the memory stores identification information of the company and information about the company in association with each other in a third region, and
    the processor, when receiving the identification information of the company, refers to the third region of the memory, generates the special problem on the basis of the company information associated with the identification information of the company, and registers the generated special problem in the first region of the memory.

2. The problem generation device according to claim 1, wherein
    the memory stores the common problem and a category to which the common problem belongs in association with each other, and
    the processor generates the crossword puzzle including the common problem stored in the memory, different from the one or more special problems corresponding to a category to which the company belongs.

3. The problem generation device according to claim 1, wherein
    the processor receives the special problem and registers the received special problem in the first region of the memory.

4. A problem generation device for generating a crossword puzzle, the device includes a processor and a memory, wherein
    (i) one or more special problems corresponding to one or more character strings to be input to blank squares of the crossword puzzle and (ii) a special correct-answer word to the one or more special problems are stored in a first region of the memory, the special problem being for a company that provides a prize to a winner from among persons who answer the crossword puzzle, and
    (i) one or more common problems which corresponds to each of a plurality of character strings to be input to the blank squares of the crossword puzzle and (ii) a common correct-answer word to the one or more common problems are stored in a second region of the memory, the common problem being common to the company and other companies, and
    the processor stores, as a first character string to be input to blank squares in a first direction starting from first coordinates of the crossword puzzle, (i) one special problem in which the length of the special correct-answer word matches the length of the first character string, from among the one or more special problems stored in the first region of the memory and (ii) the special correct answer-word to the special problem in association with coordinates of the first character string, and stores, as a second character string to be input to blank squares in a second direction starting from second coordinates of the crossword puzzle, (i) one common problem including a character common to a word included in the special correct-answer word to the special problem stored in the memory as the first character string, from among the common problems stored in the second region of the memory and (ii) the common correct answer-word to the common problem in association with coordinates of the second character string, and wherein the processor accesses a page including information about the company on the basis of an address when receiving the address of the page, generates the special problem on the basis of the company information included in the page, and registers the generated special problem in the first region of the memory.

5. The problem generation device according to claim 1, wherein
the processor generates the common problem on the basis of information provided by an external device that is connected via a communication network, and registers the generated common problem in the second region of the memory.

6. The problem generation device according to claim 1, wherein
the processor receives a selection of the company from a terminal using a prize service, and generates the crossword puzzle by randomly selecting the one or more special problems and the one or more common problems in response to the selection being performed.

7. The problem generation device according to claim 1, wherein
the memory stores a plurality of the crossword puzzles in a fourth region, and
the processor receives the selection of a company from a terminal used by a user applying for a prize, refers to the fourth region, extracts the crossword puzzle corresponding to the selected company, and transmits the extracted crossword puzzle to the terminal.

8. The problem generation device according to claim 7, wherein
the memory stores area information indicating an area where the company is located and the crossword puzzle in association with each other in the fourth region, and
the processor, when receiving a selection of the area from the terminal, transmits information indicating companies located in the area to the terminal and receives a selection of a company from among the companies.

9. The problem generation device according to claim 7, wherein
the memory stores a category to which the company belongs and the crossword puzzle in association with each other, and
the processor, when receiving a selection of a category from the terminal, transmits information indicating companies that belong to the category to the terminal and receives a selection from among the companies.

10. The problem generation device according to claim 7, wherein
the memory stores company identification information for identifying the company and information indicating an award of the prize provided by the company in association with each other, and
the processor transmits information indicating the plurality of awards to the terminal and receives a selection of a company associated with the award by receiving one award from among the plurality of awards.

11. The problem generation device according to claim 7, wherein
the memory stores a winning condition of a prize corresponding to the crossword puzzle and information related to an award of the prize, and
the processor refers to the fourth region and gives the award associated with the prize to a user who won the prize.

12. The problem generation device according to claim 7, wherein
the memory stores company identification information for specifying the company and a difficulty level of the crossword puzzle corresponding to the company in association with each other, and
the processor, when receiving a selection of the difficulty level from the terminal, transmits information indicating companies associated with the difficulty level to the terminal and receives a selection from among the companies.

13. The problem generation device according to claim 7, wherein
the processor, when receiving position information from the terminal, transmits information indicating companies located at a position within a predetermined range from a position indicated by the position information to the terminal and receives a selection of a company from among the companies.

14. The problem generation device according to claim 7, wherein
the memory stores user identification information for identifying a user of the terminal and company identification information for identifying a company in a bookmark of the user in association with each other, and
the processor, when receiving the user identification information from the terminal, refers to the memory and transmits information indicating companies corresponding to company identification information associated with the user identification information to the terminal, and receives a selection of a company from among the companies.

15. The problem generation device according to claim 7, wherein
the memory stores company introduction information for introducing a company providing the prize and the crossword puzzle in association with each other, and
the processor, when receiving a keyword from the terminal, transmits a list of companies corresponding to company introduction information including the keyword and receives a selection of a company from among the companies.

16. A problem generation method in which a processor generates a crossword puzzle, the method comprising:
storing (i) one or more special problems corresponding to one or more character strings to be input to blank squares of the crossword puzzle and (ii) a special correct-answer word to the one or more special problems in a first region of a memory, the special problem being for a company that provides a prize to a winner from among persons who answer the crossword puzzle;

storing (i) one or more common problems which corresponds to each of a plurality of character strings to be input to the blank squares of the crossword puzzle and (ii) a common correct-answer word to the one or more common problems in a second region of the memory, the common problem being common to the company and other companies;

storing, as a first character string to be input to blank squares in a first direction starting from first coordinates of the crossword puzzle, (i) one special problem in which the length of the special correct-answer word matches the length of the first character string, from among the one or more special problems stored in the first region of the memory and (ii) the special correct answer-word to the special problem in association with coordinates of the first character string in the memory; and storing, as a second character string to be input to blank squares in a second direction starting from second coordinates of the crossword puzzle, (i) one common problem including a character common to a word included in the special correct-answer word to the special problem stored in the memory as the first character string, from among the common problems stored in the second region of the memory and (ii) the common correct answer-word to the common problem in association with coordinates of the second character string in the memory, and wherein the memory stores identification information of the company and information about the company in association with each other in a third region, and the processor, when receiving the identification information of the company, refers to the third region of the memory, generates the special problem on the basis of the company information associated with the identification information of the company, and registers the generated special problem in the first region of the memory.

17. A prize management system including a problem generation device for generating a crossword puzzle and a terminal, wherein the problem generation device includes a processor and a memory, in which (i) one or more special problems corresponding to one or more character strings to be input to blank squares of the crossword puzzle and (ii) a special correct-answer word to the one or more special problems are stored in a first region of the memory, the special problem being for a company that provides a prize to a winner from among persons who answer the crossword puzzle, and (i) one or more common problems which corresponds to each of a plurality of character strings to be input to the blank squares of the crossword puzzle and (ii) a common correct-answer word to the one or more common problems are stored in a second region of the memory, the common problem being common to the company and other companies, and the processor stores, as a first character string to be input to blank squares in a first direction starting from first coordinates of the crossword puzzle, (i) one special problem in which the length of the special correct-answer word matches the length of the first character string, from among the one or more special problems stored in the first region of the memory and (ii) the special correct answer-word to the special problem in association with coordinates of the first character string in the memory, and stores, as a second character string to be input to blank squares in a second direction starting from second coordinates of the crossword puzzle, (i) one common problem including a character common to a word included in the special correct-answer word to the special problem stored in the memory as the first character string, from among the common problems stored in the second region of the memory and (ii) the common correct answer-word to the common problem in association with coordinates of the second character string in the memory, and the terminal includes:

a display, and a processor that performs the selection of the company, receives the crossword puzzle from the problem generation device, and displays the received crossword puzzle on the display and wherein the memory stores identification information of the company and information about the company in association with each other in a third region, and the processor, when receiving the identification information of the company, refers to the third region of the memory, generates the special problem on the basis of the company information associated with the identification information of the company, and registers the generated special problem in the first region of the memory.

18. A problem generation method in which a processor generates a crossword puzzle, the method comprising:

storing (i) one or more special problems corresponding to one or more character strings to be input to blank squares of the crossword puzzle and (ii) a special correct-answer word to the one or more special problems in a first region of a memory, the special problem being for a company that provides a prize to a winner from among persons who answer the crossword puzzle;

storing (i) one or more common problems which corresponds to each of a plurality of character strings to be input to the blank squares of the crossword puzzle and (ii) a common correct-answer word to the one or more common problems in a second region of the memory, the common problem being common to the company and other companies;

storing, as a first character string to be input to blank squares in a first direction starting from first coordinates of the crossword puzzle, (i) one special problem in which the length of the special correct-answer word matches the length of the first character string, from among the one or more special problems stored in the first region of the memory and (ii) the special correct answer-word to the special problem in association with coordinates of the first character string in the memory; and storing, as a second character string to be input to blank squares in a second direction starting from second coordinates of the crossword puzzle, (i) one common problem including a character common to a word included in the special correct-answer word to the special problem stored in the memory as the first character string, from among the common problems stored in the second region of the memory and (ii) the common correct answer-word to the common problem in association with coordinates of the second character string in the memory, and wherein the processor accesses a page including information about the company on the basis of an address when receiving the address of the page, generates the special problem on the basis of the company information included in the page, and registers the generated special problem in the first region of the memory.

19. A prize management system including a problem generation device for generating a crossword puzzle and a terminal, wherein the problem generation device includes a processor and a memory, in which
(i) one or more special problems corresponding to one or more character strings to be input to blank squares of the crossword puzzle and (ii) a special correct-answer word to the one or more special problems are stored in a first region of the memory, the special problem being for a company that provides a prize to a winner from among persons who answer the crossword puzzle, and
(i) one or more common problems which corresponds to each of a plurality of character strings to be input to the blank squares of the crossword puzzle and (ii) a common correct-answer word to the one or more common problems are stored in a second region of the memory, the common problem being common to the company and other companies, and the processor stores, as a first character string to be input to blank squares in a first direction starting from first coordinates of the crossword puzzle, (i) one special problem in which the length of the special correct-answer word matches the length of the first character string, from among the one or more special problems stored in the first region of the memory and (ii) the special correct answer-word to the special problem in association with coordinates of the first character string in the memory, and stores, as a second character string to be input to blank squares in a second direction starting from second coordinates of the crossword puzzle, (i) one common problem including a character common to a word included in the special correct-answer word to the special problem stored in the memory as the first character string, from among the common problems stored in the second region of the memory and (ii) the common correct answer-word to the common problem in association with coordinates of the second character string in the memory, and the terminal includes:
a display, and
a processor that performs the selection of the company, receives the crossword puzzle from the problem generation device, and displays the received crossword puzzle on the display, and
wherein the processor accesses a page including information about the company on the basis of an address when receiving the address of the page, generates the special problem on the basis of the company information included in the page, and registers the generated special problem in the first region of the memory.

\* \* \* \* \*